Sept. 12, 1933.   A. M. JONES   1,926,388

SEED HARVESTING MACHINE

Original Filed Sept. 10, 1928    3 Sheets-Sheet 1

Inventor

Albert M. Jones

Sept. 12, 1933.   A. M. JONES   1,926,388
SEED HARVESTING MACHINE
Original Filed Sept. 10, 1928    3 Sheets-Sheet 2

Inventor
Albert M. Jones,
By Harry C. Schroeder
Attorney

Sept. 12, 1933.　　　　A. M. JONES　　　　1,926,388
SEED HARVESTING MACHINE
Original Filed Sept. 10, 1928　　　3 Sheets-Sheet 3
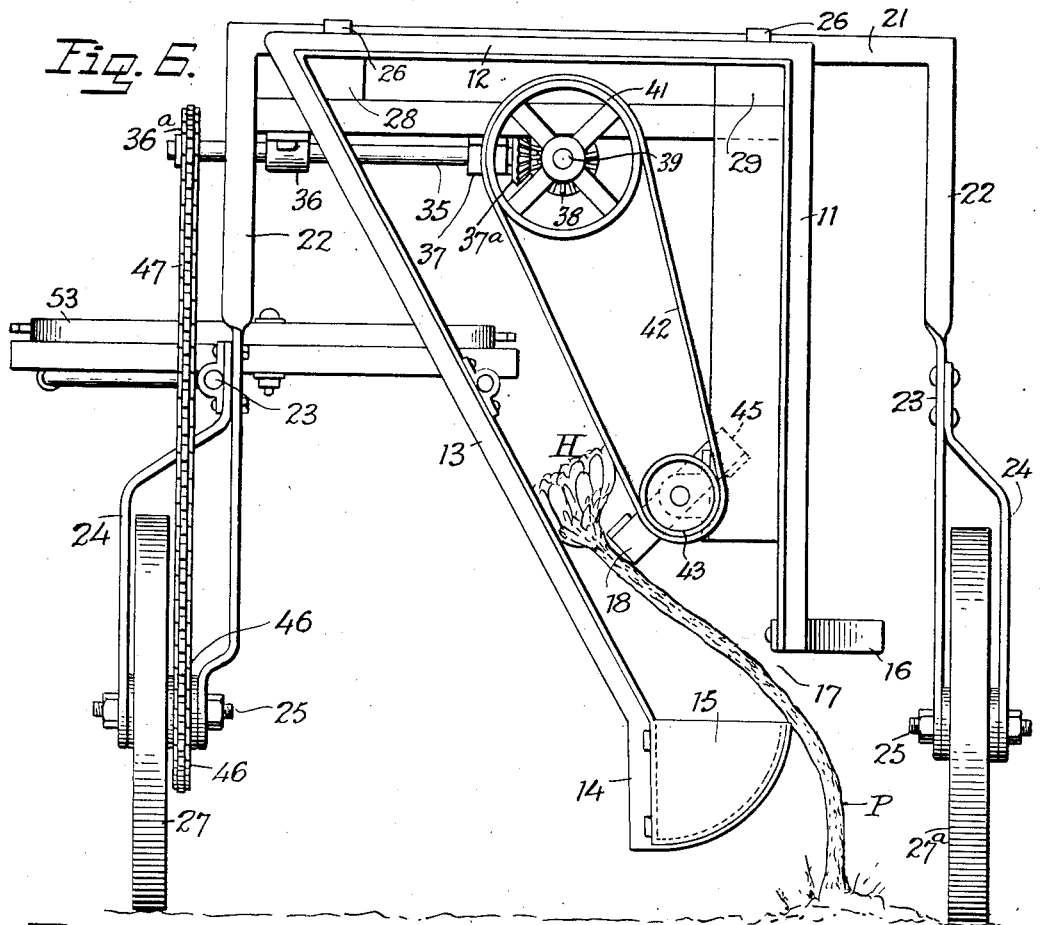
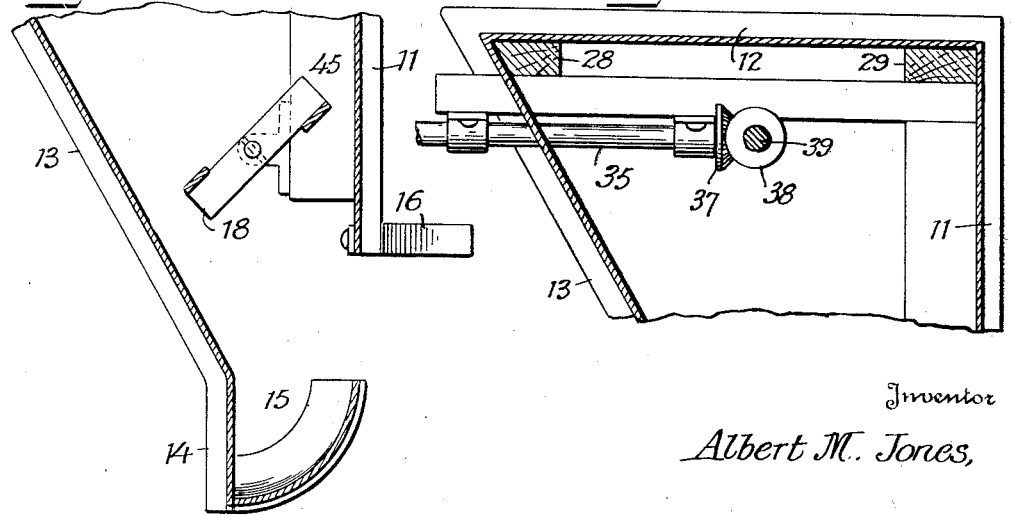

Patented Sept. 12, 1933

1,926,388

UNITED STATES PATENT OFFICE 1,926,388

SEED HARVESTING MACHINE

Albert M. Jones, Oakland, Calif.

Original application September 10, 1928, Serial No. 304,901. Divided and this application December 31, 1929. Serial No. 417,743

11 Claims. (Cl. 56—126)

The invention is for a seed harvesting machine.

One of the objects of the invention is to provide a seed harvesting machine for harvesting the seed of plants and more particularly the seeds of plants planted in rows, such for instance as lettuce, onions, beets and the like.

Another objection of the invention is to provide a device of the character indicated that may be moved along the rows of plants for harvesting the seed whereby the seed stalks may be gently guided without unnecessary jarring into the body of the device where they may be acted upon to dislodge the seed from the seed pods and collected in a receptacle from which they may be readily moved for packing or storing.

Another object of the invention is to provide a seed harvesting device of the character indicated wherein the seed stalks of the plants in a row may be gently guided into the body of the harvester while the harvester is passed along and parallel with the row of plants and the seed stalks beaten and agitated for dislodging the seeds from the seed pods without injury to the seed or the breaking of the plant.

Another object of the invention is to provide a seed harvesting device of the character indicated wherein the harvester may be passed over a row of seed plants and the plants guided into the body of the harvester and the seed dislodged from the seed pods by beaters operated by the wheel of the harvester while being passed over the plants.

Another object of the invention is to provide a device of the character indicated that may be propelled by hand, drawn by an animal, or propelled by a gasoline motor.

The invention will be hereinafter fully set forth and particularly pointed out in the claims.

A copending application for seed harvesters and directed to the method of harvesting lettuce seed was filed Sept. 10, 1928, under Serial No. 304,901, of which the present application is a division.

In the accompanying drawings.

Figure 6 is a front end view.

Figure 7 is a fragmentary enlarged detail showing the beater, guide arm, and upturned end of the trough.

Figure 8 is an enlarged sectional detail.

Figure 1:
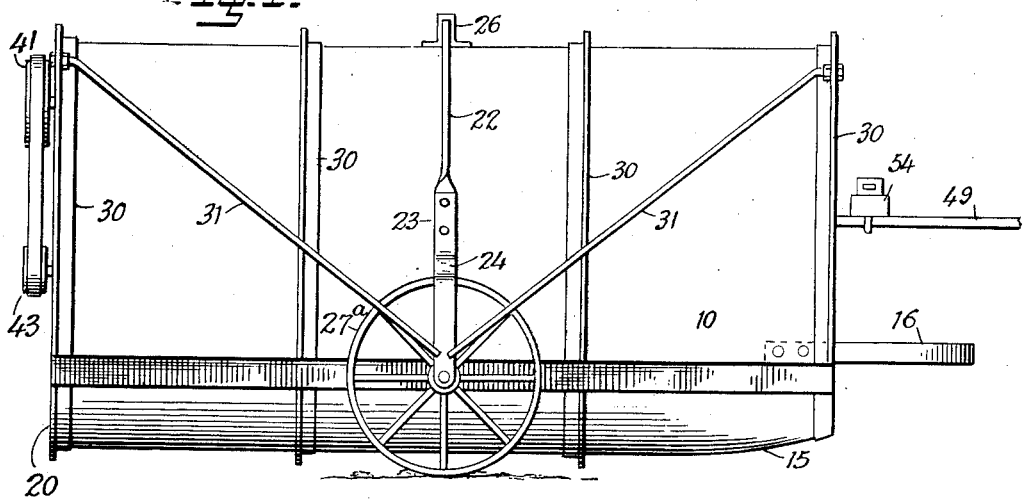
Figure 1 is a side elevation of the seed harvester.
Figure 2:
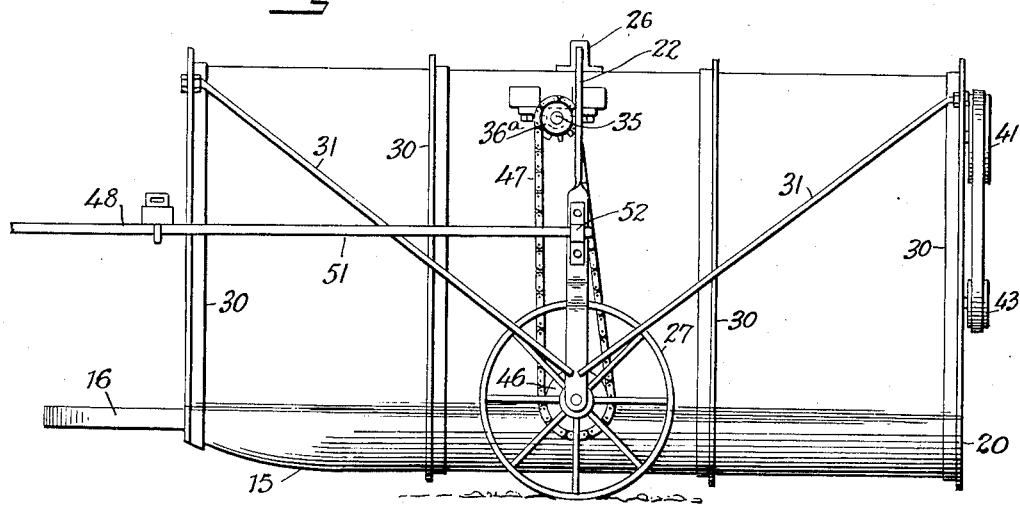
Figure 2 is an elevation taken from the opposite side thereof.
Figure 3:
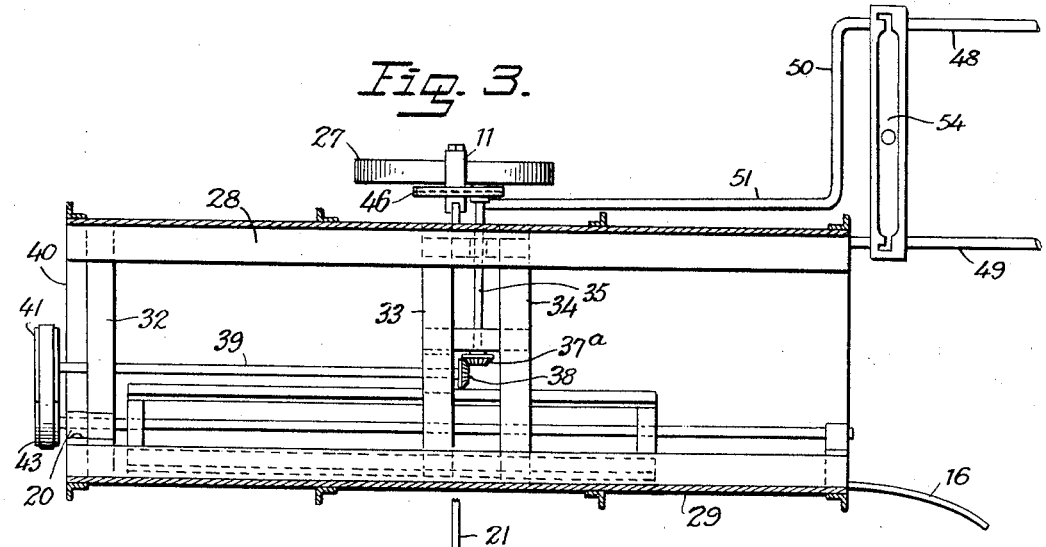
Figure 3 is a top plan view with the top of the body portion removed.
Figure 4:
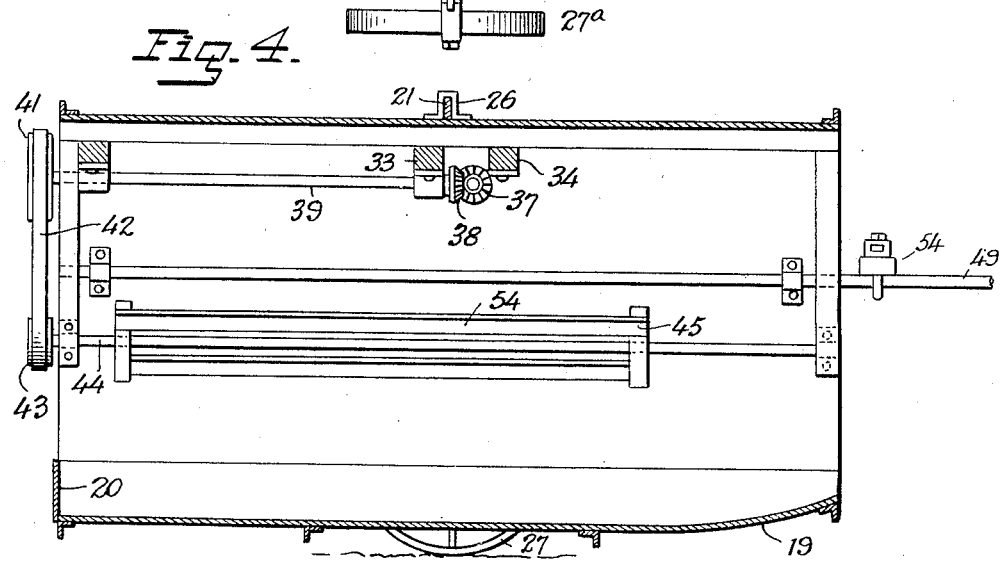
Figure 4 is a side elevation with the side of the body portion removed in order to show the internal mechanism.
Figure 5:
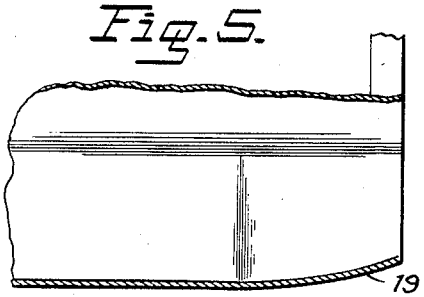
Figure 5 is a fragmentary section of the seed collecting trough showing the upwardly turned front end thereof.

Referring to the drawings:

Reference character 10 indicates the body of the improved harvester which is preferably made of sheet metal having a perpendicular wall 11, a top wall 12 and an inwardly and downwardly inclined wall 13. The inwardly and downwardly inclined wall 13 extends to a point slightly below the bottom of the perpendicular wall 11 and terminates in a perpendicular portion 14 to which is secured in any suitable manner a seed collecting trough 15, preferably, though not necessarily, outlining a sector in cross section. To the forward end of the wall 11 is secured the forwardly and outwardly extending guide arm 16 which is for the purpose of positioning to one side the plants P in a row intermediate the adjacent wheel and the plants in such manner as to gently bend the plant stalk inwardly of the harvester body and guide it through the space 17 forming a passageway between the bottom of wall 11 and the top of the trough 15 forcing the top H of the seed stalk into spaced relation with the inwardly and downwardly inclined wall 13 and into the path of rotation of beaters 18 for beating and vibrating the seed stalk to dislodge the seeds from the seed pods against the inwardly and downwardly inclined wall 13 when they will descend by gravity into the seed collecting trough 15.

It will be understood that the space 17 extends throughout the entire length of the body of the harvester and is open at its rear end. The forward end of the bottom of the trough 15 is curved upwardly as at 19 for the purpose of preventing wasting of the seed by spilling. The rear end wall 20 of the seed collecting trough may be in the form of a hinged gate for conveniently removing the seed collected therein therefrom. The body 10 is supported in spaced relation to the ground by the yoke designated by reference character 21 generally and comprises downwardly extending portions 22 which are twisted 180° intermediate the ends as at 23 and have secured thereto outwardly extending journal brackets 24. The lower ends of journal brackets 24 and portions 22 having registering apertures therethrough for the introduction of axles 25 upon which wheels 27 and 27a are journaled.

The body 10 is secured to the yoke 21 by means of clevises 26 which span the yoke and pass through the top wall of the body 10 and are secured to cleats 28 and 29 which are preferably made of wood and are positioned in the respective angles of the top and side walls of the body 10. These clevises may be secured to the cleats in any of the well known ways.

The body 10 is provided with bands 30 which are preferably made of angle iron for lending rigidity to the body and brace rods 31 attached at their upper ends to the angle of the angle iron 30 and adjacent the top thereof are attached at their lower and converging ends to bearing brackets 24 for bracing the bearing brackets. Supporting members 32, 33, and 34 extend transversely of the body and are affixed to the undersides of cleats 28 and 29. Shaft 35 is journaled in brackets 36 and 37 affixed to the transverse supporting members 33 and 34 and extends beyond the outer face of the wall 13 and has affixed thereto sprocket wheel 36a. Shaft 35 is provided at its inner end with bevel gear 37a which is in constant mesh with bevel gear 38 carried by driving shaft 39 which extends through the rear end wall 40 of the body and has affixed thereto belt wheel 41 which is operably related by belt 42 to belt wheel 43 affixed to the outer end of the beater shaft 44 which is provided with a beater 45 for beating the heads H of the plant P to dislodge therefrom the seeds within the seed pods of the plant, causing the seed to descend by gravity over the inner face of wall 13 into the seed collecting trough 15. Wheel 27 is provided with sprocket 46 which is operably related to sprocket wheel 36a by sprocket chain 47.

From the foregoing description of the seed harvester, it will be readily seen that when the harvester is moved over a row of seed plants causing the rotation of wheel 27 that rotation will be imparted to shaft 35 through sprocket chain 47 passing over sprocket wheel 36a.

Carried by the end of the shaft 35 which will result in the rotation of shaft 39, belt wheel 41, belt wheel 43 and beater shaft 44, causing the beater blades to intermittently strike the head H of the plant P knocking it against the inclined wall 13 from which it will be rebound by reason of the resistance of the plant stem when it will again be knocked by a beater blade against the wall 13 throughout the length of time it takes for a plant stalk to pass through the entire length of the body of the harvester, thus effectively and positively threshing the ripe seed from the seed pods of the plants and depositing them in the seed collecting trough 15. When the rear end of the body of the harvester has passed beyond a plant in a row, the plant will immediately resume an upright position, when after a lapse of suitable time for the unripened seed remaining in the pods of the plant to ripen, the harvester may again be run over the plants for the purpose of collecting the seeds which have ripened during the interim between the first harvesting and the second and so on until the last of the seeds of the plants have been harvested.

The improved seed harvester as illustrated in the drawings is provided with shafts 48 and 49 positioned to one side of the body 10. The shaft 48 being bent inwardly toward the body 10 and in alignment with the front thereof as at 50 and then carried rearwardly as at 51 and attached at its rear end to the side of yoke 21 as at 52, the shafts being provided with the usual single tree 54 in order that the harvester may be drawn by a draft animal. The device however, may be provided with the customary handles for agricultural implements for pushing the harvester over the plants, or a gasoline motor or the like may be provided for propulsion.

Having thus described the invention, what is claimed is:

1. A wheeled seed harvester comprising a body portion having a top, a vertical wall and an inwardly and downwardly inclined wall, the last named wall extending slightly below the bottom of the first named wall, a trough supported by the last named wall and below the bottom of the first named wall, a forwardly and outwardly curved guide arm affixed to the front face of the vertical wall, a rotatable beater positioned within the body portion and operably related to one of the wheels.

2. A wheeled seed harvester comprising a body portion having a top, a vertical wall and an inwardly and downwardly inclined wall, the last named wall extending slightly below the bottom of the first named wall, a trough supported by the last named wall and below the bottom of the first named wall, the outer side of said trough being in vertical alignment with the vertical wall, a forwardly and outwardly curved guide arm affixed to the front face of the vertical wall, and a rotatable beater positioned within the body portion and operably related to one of the wheels.

3. A wheeled seed harvester comprising a body portion having a top, a vertical wall and an inwardly and downwardly inclined wall, the last named wall extending slightly below the bottom of the first named wall, a trough supported by the last named wall and below the bottom of the first named wall, the bottom of the trough being curved upwardly at its forward end, a forwardly and outwardly curved guide arm affixed to the front face of the vertical wall, and a rotatable beater positioned within the body portion and operably related to one of the wheels.

4. A seed harvester comprising a body portion having a passageway extending through one side and adjacent the bottom thereof, a body supporting yoke, wheels journaled in the yoke, a trough within the body portion and below the passageway and a beater within the body portion and above the trough, said beater being operably related to one of the wheels.

5. A seed harvester comprising a body portion having a passageway extending through one side and adjacent the bottom thereof, a body supporting yoke, wheels journaled in the yoke, a trough within the body portion and below the passageway, a beater within the body portion and above the trough, said beater being operably related to one of the wheels, and a guide arm secured to one side of the body portion and above the passage way.

6. A seed harvester comprising a body portion, said body portion having a top, a vertical wall and an inwardly and downwardly inclined wall extending to a point below the vertical wall, the inwardly and downwardly inclined wall terminating in a vertical portion at its lower end, a trough secured to the said vertical portion and below the said vertical wall, a guide arm extending from the front of the vertical wall, a yoke for supporting the body portion, wheels journaled in the yoke, and a beater positioned within the body portion and above the trough, said beater being operably related to one of the wheels.

7. A seed gathering device including a housing arranged to be drawn along the ground in parallel and close relationship to one side of a row of plants to be acted on; the ends and bottom of the housing being open, a trough under and spaced from the bottom of the housing and mounted in connection therewith on one side; there being a continuous slot between the bottom of the housing and the top of the trough along one side of the trough, means for deflecting the tops of the plants laterally into the housing through said slot with the forward movement of the device, and means in the housing for removing the seeds from said tops while thus deflected.

8. A structure as in claim 7, in which said deflecting means comprises an arm projecting forwardly and outwardly from the front of the housing at the top of the slot.

9. A seed gathering device including a housing arranged to be drawn along the ground in parallel and close relationship to one side of a row of plants to be acted on; the ends and bottom of the housing being open, a trough under and spaced from the bottom, of the housing and mounted in connection therewith on one side; there being a continuous slot between the bottom of the housing and the top of the trough along one side of the trough, means for deflecting the tops of the plants laterally into the housing through said slot with the forward movement of the device, and a beater structure mounted in the housing lengthwise thereof and disposed close to the bottom thereof.

10. A structure as in claim 9, with means for rotating the beater structure with the forward movement of the housing.

11. A seed gathering device including a housing arranged to be drawn along the ground in parallel and close relationship to one side of a row of plants to be acted on; the ends and bottom of the housing being open; means supporting the housing so that said bottom is a predetermined distance from the ground, means for deflecting the tops of the plants laterally into the housing from the bottom thereof, means in the housing for removing the seeds from the tops while thus deflected, and means mounted in connection with the housing for catching the seeds.

ALBERT M. JONES.